United States Patent [19]

Goldmacher

[11] 4,034,393
[45] July 5, 1977

[54] FILM REGISTRATION DEVICE

[76] Inventor: Howard K. Goldmacher, 136 Worthen Road, Lexington, Mass. 02173

[22] Filed: Feb. 24, 1976

[21] Appl. No.: 660,842

[52] U.S. Cl. .................. 354/354; 116/114 J; 354/215; 354/217
[51] Int. Cl.² .................................. G03B 19/00
[58] Field of Search .......... 116/114 J; 242/57, 71.6; 354/207, 214, 215, 217, 218, 275, 289, 354

[56] References Cited

UNITED STATES PATENTS

| 2,591,417 | 4/1952 | Frye | 354/214 X |
| 3,460,449 | 8/1969 | Eagle | 354/354 |
| 3,894,507 | 7/1975 | Koechlin | 116/114 J |

*Primary Examiner*—John Gonzales
*Attorney, Agent, or Firm*—Macdonald J. Wiggins

[57] ABSTRACT

A device for providing means enabling a user to rewind a partially-exposed film strip packaged in a film cassette, to then remove the cassette from the camera, and thereafter to reinsert the film into the camera with the assurance of correct registration of the previously-exposed frames with the shutter opening and with the camera frame counter. This invention also pertains to the method of modifying the film strip to form the device. One embodiment of the device is a small, rectangular laminated tab having a body of flexible plastic material formed into a compressible hook at one end, which tab is installed near the tongue end of the film either by the user or by the film manufacturer. The bottom lamination of the tab is of self-adhesive material for adhering the tab to the tongue end of a film strip and the top lamination is a decalcomania having film index marks and a set of numerals at least equal to the number of exposure frames of the film printed thereon, the numerals being of a rub-off nature. When the tab is properly installed on the film tongue end, installed in a camera, and the index marks aligned with the camera drive sprocket teeth, a desired number of exposures is then made. The film can then be rewound into the cassette with the tab hook preventing rewinding of the tongue into the cassette, the cassette removed from the camera, and the last exposed frame number recorded by rubbing off the corresponding numeral from the decalcomania. Subsequently, the cassette can be reinstalled in the camera, the index marks realigned with the drive sprocket teeth, and the film accurately advanced to the next unexposed frame.

9 Claims, 8 Drawing Figures

FILM REGISTRATION DEVICE

BACKGROUND OF THE INVENTION

1. Field of the Invention

The invention relates to devices for providing a predetermined registration of film in a camera, and more specifically, to a device for allowing a partially-exposed 35mm film strip packaged in a film cassette to be rewound, removed from the camera, subsequently reinserted into the camera, and advanced to the next unexposed frame accurately.

2. Description of the Prior Art

Users of 35mm cameras have available many different types of film — for example, monochromatic films of various film speeds and grain characteristics; color films of negative and reversal type; and special process films. It is the practice in the art to package 35mm film in cartridges or cassettes having sufficient length for 20 or 36 exposures. Both professional and amateur photographers experience occasions in which the film in the camera is not the type appropriate for the particular photographic situation at hand. For such occassions, professional photographers typically utilize multiple cameras, each loaded with a different type of film. Needless to say, this approach is too expensive for many amateur photographers. Large format cameras having interchangeable film-holding backs are also in common use for this purpose, but are not available for 35mm cameras.

However, when the photographer desires to use one 35mm camera and this need arises, he may resort to rewinding the partially-exposed film back into its cassette, removing the cassette and installing another cassette of film. To save the unexposed film of the first cassette for future use, he must be very careful not to wind the tongue end of the film completely into the cassette, as it would then not be possible to recover the film end.

When subsequently reinstalling a correctly-rewound cassette into the camera, there is no inherent index on or associated with the film to ensure that the actual positions of the previously exposed frames coincide with the shutter opening or that the numbers of the exposed frames are correctly synchronized with the frame counter of the camera. Consequently, it is common practice to advance the film one or two frames beyond the number of the last exposed frame as read on the film counter. This action creates "safety frames" to prevent possible overlap of the last previously exposed frame and the next frame exposed after such reinstallation. As may be recognized, the safety frame space represents a waste of film. Another problem arises with this method since automatic commercial film processing equipment may cut the film strip into short lengths of four or five frames based on indexing to the first frame. If the space is not an exact integral number of frames, there is the danger that this operation will result in cutting into the picture area of the misaligned, later-exposed frames.

SUMMARY OF THE PRESENT INVENTION

My invention provides a device and method whereby the photographer can expose any selected number of frames of a 35mm cassette film installed in a 35mm camera and rewind the film without danger of rewinding the film tongue into the cassette. He can then conveniently record the last exposed frame by means of my invention. When subsequently reinstalling the film in th same camera, use of my invention will ensure exact registration of the previously-exposed frames with the shutter opening and in synchronism with the frame counter of the camera. The photographer can then advance the film to the first unexposed frame remaining on the film strip by observation of the film counter and thereby obviate the waste of exposures entailed in safety frames, and additionally preclude the danger of frame overlap and/or improper cutting by automatic processing machines.

My new device consists of a small laminated tab of a size to be attached to the film leader or tongue section normally projecting from an unused cassette of film. The body of the tab is an elongate, rectangular piece of thin, flexible plastic having a preformed end. The upper lamination is a decalcomania substrate having the numbers 1 through 36 deposited thereon and index marks along one edge. The mode of deposition of the numbers is such that a number may be easily rubbed off with a finger or the like to designate the last exposed frame. The lower lamination is a self-adhesive substrate such as double-sided transparent tape or the like for securing the tab to the film tongue.

The preformed end serves to prevent the film tongue from being would into the cassette during the rewind process, and the index marks indicate the correct film position when reinstalling the cassette and film.

It is therefore a primary object of my invention to provide a device and method to allow a number of frames less than the total number of the film in a 35mm cassette to be exposed in a 35mm camera, the film to be safely rewound, and the last exposed frame number indicated.

It is another object of my invention to allow the partially exposed film cassette to be reinstalled in the camera, with the exposed frames correctly aligned with the shutter opening and the frame numbers of the previously exposed frames synchronized with the frame counter.

It is another object of my invention to provide a device that can be manufactured at very low cost, and is disposable after one use.

It is a further object of my invention to provide a device that is quickly and easily installed on the tongue end of a film in a film cassette.

It is yet another object of my invention to provide a device and method of reinstalling a partially-exposed 35mm film cassette in a 35mm camera with correct registration of the exposed frames so as to prevent waste of film and danger of incorrect cutting of the film during processing by automatic equipment.

These and other objects and advantages of my invention will become apparent from the following detailed description and accompanying drawings.

DETAILED DESCRIPTION OF THE INVENTION

Figure 1:
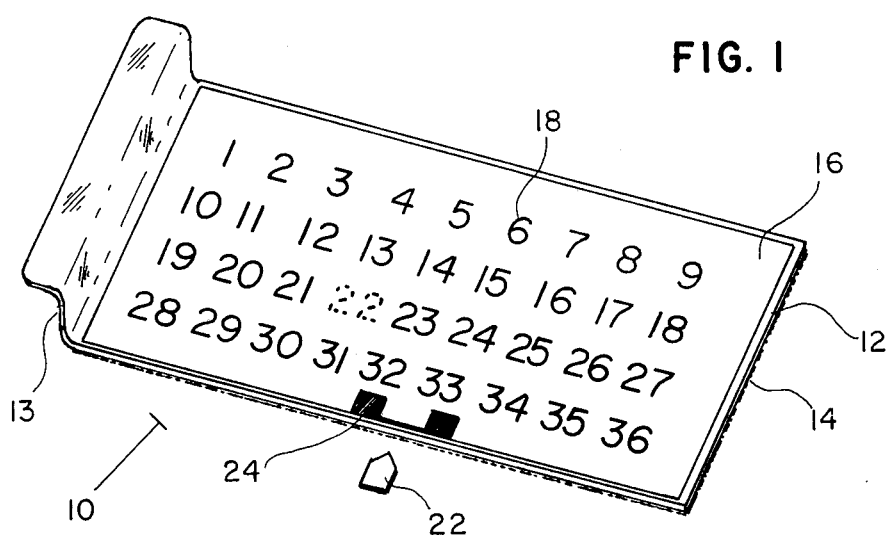
FIG. 1 is a perspective view of the tab device to be attached to a 35mm film tongue end and an index marker in accordance with a preferred embodiment of my invention.

The basic elements of a peferred embodiment of my film registration device are a laminated tab 10 and an index mark 22, as shown in FIG. 1 Tab 10 consists of a body 12 fabricated from a stiff, yet flexible, plastic material. For example, cellulose acetate and proponate are suitable material, although many other types of plastic may be used. A thicknes of the plastic of 6–10 mils is satisfactory. One end of body 12 is preformed to have an upward curved hook 13, best seen in FIG. 2, with dimension A being on the order to 1/16 inch. As may be understood, the use of a suitable plastic for body 12 allows the cruved hook 13 to be flattened out under pressure, yet return to its original shape when the pressure is relieved, as will be discussed in more detail hereinafter. Hook 13 is preferably formed by heating and bending the tab end, although cold-forming is suitable for some materials.

An adhesive substrate 14 is disposed on the underside of tab 12 extending the length of the flat portion thereof. Substrate 14 may be a layer of 1 mil double-sided mylar pressure-sensitive self-adhesive tape, or, alternatively may be a coating of adhesive material on the underside of tab 12. The upper surface of tab 12 has a printed decalcomania layer 16 or the like disposed thereon. Layer 16 contains a set of the numbers 1 through 36 (18) printed thereon, as well as index marks 24. The numbers 18 are of the ruboff type, and a number may be easily removed by rubbing with the fingernail, pencil erase, or the like. As an example, number 22 is indicated as having been removed from layer 16.

The size of my device is not critical, although I prefer that the tab 12 be approximately ⅝ inch wide and 1½ inches long. Index mark 22 is preferably formed of a white plastic tape having a self-adhesive backing.

Figures 2A, 2B:
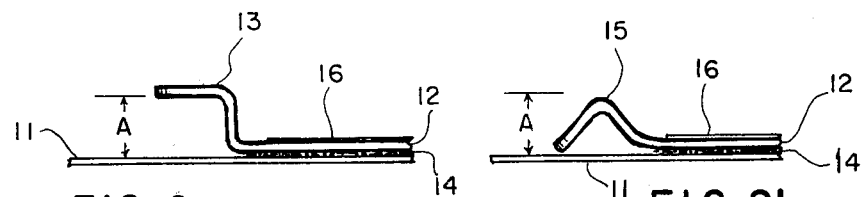
FIG. 2a is a partial side view of the tab of FIG. 1 showing the laminated construction thereof.
FIG. 2b is a partial side view of a tab showing an alternative form for the hook end.

In FIG. 2a, a partial side view of the hook-end of the tab 10 is shown, as attached to a film base 11. The laminated construction of the tab 10 can be seen. Hook 13 is formed as an approximately S-shape. The shape of hook 13 is not critical since its role in accordance with my invention is to contact the cassette light trap and prevent the film from being completely drawn into the cassette during rewind. For example, the wedge-shaped hook 15 of FIG. 2b is an alternative shape the provides certain advantages to be described below.

Figure 3:
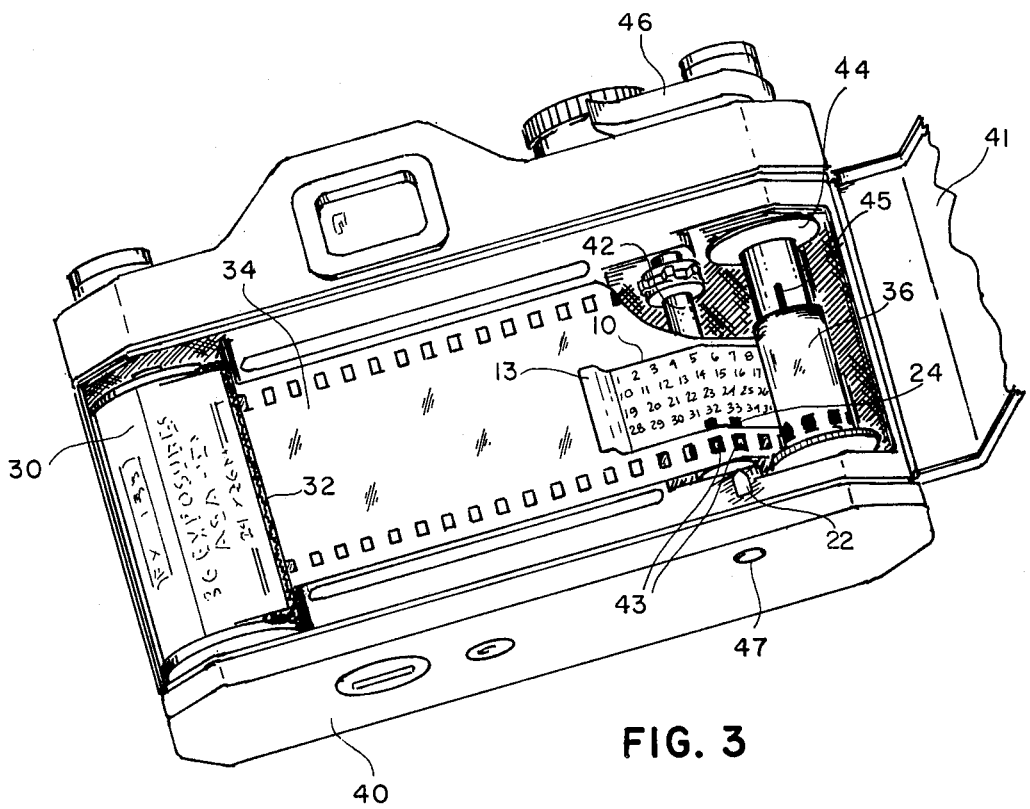
FIG. 3 is perspective view of a 35mm film cassette and tongue end of the film utilizing my film registration device as properly installed in a 35mm camera.

Turning now to FIG. 3, a typical installation of tab 10 on a film and the proper installation of the film is a 35mm camera is illustrated. Camera 40 is shown with its back cover 41 (partial view) open. The tip of film tongue end 36 has been secured in a slot 45 of take-up spool 44 and the film advanced two frames by cocking lever 46.

Sprocket element 42 represents the film drive sprocket for the typical 35mm camera 40 suitable for using my device and method. As is well known, sprocket 42 is coupled to film advance and shutter cocking level 46 and the film counter (not shown) when cover 41 is closed. It is common for sprocket 42 to have six teeth 43 for engaging perforations along the edges of film 34 while the length of a frame (36mm) matches eight perforations in the film. To utilize my invention, a film cassette 30 is installed in the camera as shown, and the tongue end 36 of the film strip 34 is inserted in slot 45 of take-up spool 44, engaging the teeth 43 of sprocket 42 with the perforation of tongue 36. Cocking lever 46 is operated to advance the film two frames. Since cover 41 is open, the advancing operation does not cause the film counter to advance.

Figure 4A:
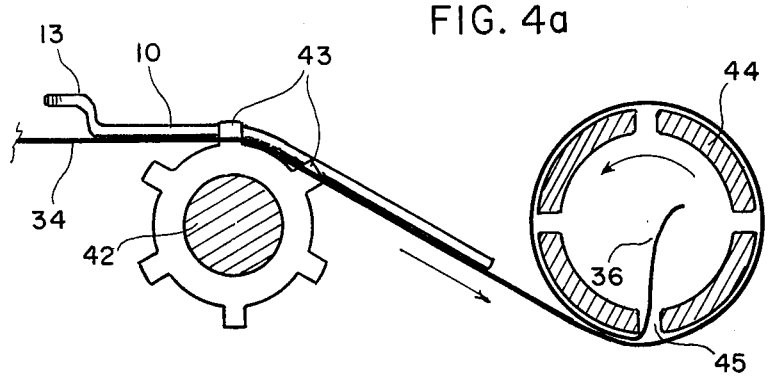
FIG. 4a is a cross-sectional view of the film drive sprocket and th film take-up spool of a 35mm camera showing a film having the tab of my film registration device installed thereon and in the position prior to winding of the film on the take-up spool, or after partially rewinding the film into the film cassette.
Figure 4B:
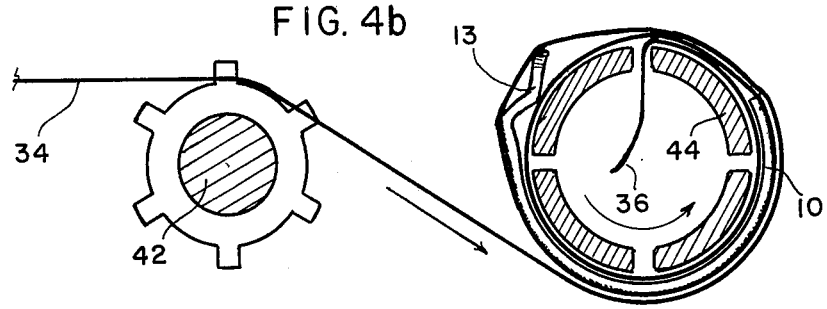
FIG. 4b is the film of FIG. 4a would onto the take-up spool showing the flattening of the tab hook in accordance with my invention.

At this point and as shown by FIG. 3, tab 10 is attached to film tongue end 36 by means of the adhesive substrate 14, carefully matching index marks 24 with the two uppermost teeth 43 of sprocket 42. Although not essential, I prefer to install index mark 22 directly opposite teeth 43, as shown, to make the tab installation more easily performed. Next, back cover 41 is closed and locked, thereby engaging sprocket assembly 42 with the film counter which will indicate an "S" or start position on most cameras. The film may now be advanced to the "0" or first exposure point of the film counter. As the film is advanced, the film tongue 36 is wound onto spool 44, and tab 10 (by virtue of its flexibility) easily conforms to the curvature of spool 44. Furthermore, curved end 13 partially flattens without impeding the normal winding of the film. This action is best seen in FIG. 4, which shows sprocket 42 and spool 44 in cross-section, with film strip 34, tab 10, and film tongue 36 seen in side view. In FIG. 4a, film tongue 36 is shown in the position at time of installation of tab 10 illustrated in FIG. 3. As may be seen, hook 13 is in its open position, prior to advancing the film and winding the film onto spool 44. In FIG. 4b, film 34 has been partially wound onto spool 44. As may now be seen, tab 10 does not interfere with such winding due to its flexibility and hook 13 tends to flatten out from the pressure of the wound film.

During the rewind process, when the tongue end 36 of film 34 leaves spool 44, hook 13 springs out to its original shape and the condition of FIG. 4a again obtains.

Returning now to the use of the camera after having the film counter set to 37 0", and with reference to FIG. 3 the camera may be used in normal fashion to the point at which the photographer desires to remove the film prior to exposing all of the frames. At this time, the number of the last exposed frame is noted from the frame counter, rewind button 47 is depressed, and the film is rewound into cassette 30. As tongue end 36 of film 34 pulls free from spool 44, hook 13 of tab 10 springs out to its normal shape as discussed above. As may now be seen, continued winding will cause hook 13 to contact light trap 32 of cassette 30, preventing tongue end 36 from being completely rewound into the cassette. In some cameras, end 13 may contact the film pressure plate instead of the light trap 32. In such a case, the camera back is opened, the cassette removed and rewinding completed manually. It is for this case that I prefer the wedge-shaped hook 15 shown in FIG. 2b.

This hook shape will pass under the film pressure plate, yet will be stopped by the cassette light trap.

After completing the rewinding and removing the cassette from the camera, the last-noted exposed frame number is rubbed off of decalcomania substrate 16, advantageously recording this required information for later use.

At a later time when it is desired to complete the partially-exposed roll of film, camera back cover 41 is opened. The cassette is installed and tongue end 36 is inserted in slot 45 of spool 44. The film 34 is advanced two frames by cocking lever 46 securing the film on spool 44. At this point, tab 10 will be in approximately the same position as at time of original installation. The two index marks 24 are again aligned with the two uppermost teeth of sprocket 42. Spool 45 can be turned against its clutch manually without affecting the position of sprocket 42. Thus, tab 10 index marks 24 can be easily brought into exact alignment with the correctly-matching sprocket teeth 43. Index mark 22 assists in this alignment by virtue of its white surface in contrast with the black camera frame.

The last previously exposed frame is noted from the numbers 18 and the camera back 41 is closed, again engaging the frame counter. As may now be understood, through the use of my film registration device, the frame counter is exactly synchronized with the film driving sprocket element 42, the film strip 34, and its previously exposed frames. The photographer now advances the film by cocking the advance lever 46 and releasing the shutter with a lens cap in place until the counter reads the next unexposed frame, which is one beyond the number indicated on the decalcomania substrate 16. The camera is now ready to expose additional frames of film strip 34.

In accordance with my invention, the photographer is able to accurately register exposed frames with the exposure counter of the camera, and can therefore complete exposure of remaining frames without waste of film. Furthermore, the spacing between earlier exposed frames and later exposed frames will be identical when developed, and can be cut into short lengths with automatic equipment without danger of cutting into a frame.

Having shown a preferred embodiment of my invention, I will now describe alternative implementations that fall within the scope of my invention.

Figure 5:
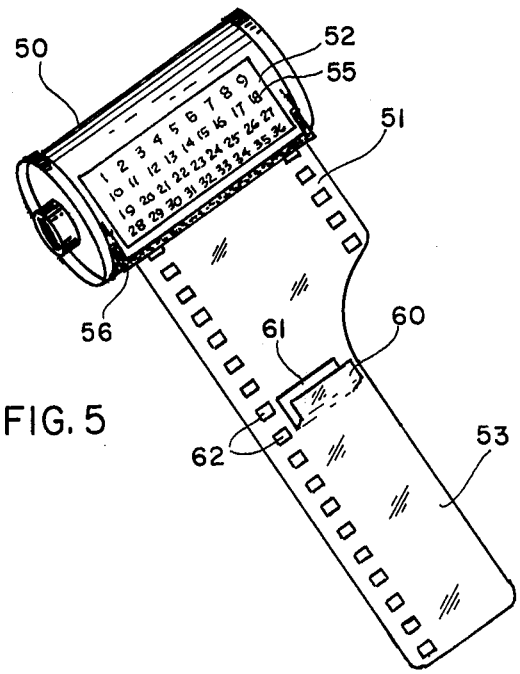
FIG. 5 is a perspective view of a 35mm film cassette with an alternative implementation of my invention involving formation of a projecting flap hook in the film stock.

FIG. 5 illustrates one alternative implementation which uses a projecting flap or hook 60 formed directly from the film base 51. A rectangular tab is cut on three sides creating opening 61 and flap 60. Flap 60 thus created is bent outward as shown thus forming a projecting hook. Opening 61 is cut with its short side immediately adjacent to two sprocket holes 62 and having a length essentially equal to the total length of sprocket holes 62. Flap hook 60 is utilized in the same fashion as previously described with reference to tab 10.

To install cassette 50 in a camera, the back is opened, film tongue 53 is inserted in the take-up spool slot and the cocking lever advanced to cock the shutter. At this point the take-up spool is turned with the thumb slipping its clutch until sprocket holes 62 will fit over the upper two sprocket teeth. Cassette 50 is then dropped into place, the camera rewind knob engaged, and the rewind turned to take up any slack. The camera back is closed and the camera is ready for use. As film strip 51 is wound on the take-up spool, flap 60 tends to flatten and does not interfere with the rewinding.

As may be noted, no index marks are required for this implementation since sprocket holes 62 provide the necessary reference. After partially exposing film strip 51, the film is rewound, flap 60 will spring out and will catch on either the camera film pressure plate or light trap 56 of cartridge 50.

Before opening the camera to remove cassette 50, the last exposed frame is noted. After removing cassette 50, decalcomania 52, affixed to cassette 50 and having rub-off numbers 55, is utilized as previously described to note the last exposed frame by erasing the appropriate number. Thus, the cassette is prepared for its next use.

As may be understood, decalcomania 52 may be supplied with a self-adhesive backing for installation on any cassette, or may be printed directly on the cassette at time of manufacture. As may be recognized, this embodiment can be implemented at virtually no cost, yet will greatly extend the usefulness of the cassette.

Figure 6:
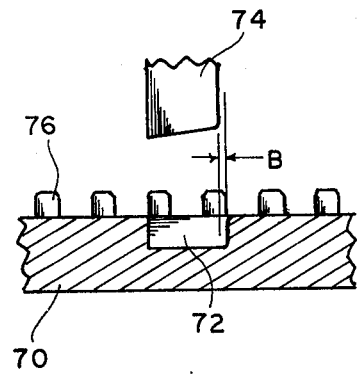
FIG. 6 is a partial view of the operative elements of a tool suitable for forming the flap hook shown in FIG. 5.

The implementation of FIG. 5 can be added to any film cassette and film strip be means of a forming tool such as partially shown in FIG. 6. The tool comprises base 70 having a female die 72 and a row of sprocket-hole engaging teeth 76 positioned to hold film tongue 53 in the desired position for forming tab 60. The distance from the end of tongue 53 to flap 60 is selected to allow about two turns of film around the take-up spool to bring sprocket holes 62 in proper relation with the drive sprocket teeth in accordance with my invention.

Male die 74, shown in its normal operative position, has cutting edges on the three sides corresponding to opening 61. The fourth non-cutting side is relieved as shown as is the matching side of the female die 72. Space B as shown in selected to be essentially equal to the thickness of the film stock to be punched. Thus, when male die 74 is forced downward through the film stock, flap 60 will be sharply bent in the desired hook shape.

The tool, partially depicted in FIG. 6, can be utilized in automatically operated equipment for use during manufacture of the cassette package, or it can be incorporated in a manual punching configuration for use with purchased cassette packages.

As will be evident to those skilled in the art, various modifications of the specific configurations of my film registration device that I have disclosed are possible without departing from the scope or spirit of my invention. For example, the projection on the base side of the film in accordance with my invention can be formed in a number of alternative ways. A shallow dimple or dimples can be pressed into the film and will serve to provide the required mechanical stop, yet not interfere with the winding of the film strip on the takeup spool. Alternative add-on projection can be formed from foam rubber, felt strips, or the like and all such embodiments are considered to fall within the scope of my invention.

While I have characterized the projection disposed on the film as a mechanical stop, it is to be understood that a user could, by applying sufficient force to the rewind crank, overcome the stopping action; however, this action is not an intended use of my invention. The resistance felt by the user when the projection contacts the cassette light trap provides ample notice to the user to cease rewinding in accordance with my invention.

I claim:

1. A device to enable a film strip packaged in a cassette to be installed in a camera, less than the total number of frames to be exposed, the film strip to be rewound into the cassette without rewinding the tongue end of the film into the cassette, the cassette to be removed from the camera, the cassette to be subsequently reinstalled into the camera, and the film strip to be advanced to the first remaining unexposed frame with correct registration with respect to the camera exposure counter and the exposed frame, comprising:

a projection disposed near the tongue end of the film strip forming a mechanical stop and arranged to contact the light trap of the film cassette during a rewind operation, thus alerting the user to cease rewinding thereby preventing rewinding of the film end into the cassette, said projection having associated index means alignable with selected teeth of the camera film drive sprocket.

2. The device as defined in claim 1 in which said projection is an essentially rectangular tab, said tab being constructed of a thin, flexible material whereby said tab does not interfere with winding of the film strip on the camera film takeup spool, said tab having a self-adhesive for attaching said tab to the film strip, and said tab having a hook formed on one end whereby said hook contacts the light trap.

3. The device as defined in claim 2 in which said tab further comprises a plurality of printed numerals deposited thereon, individual ones of said numeral capable of being easily removed, whereby selected frames of the film strip can be identified by removal of the corresponding numeral.

4. The device as defined in claim 1 in which said projection is a flap cut into the film strip and bent outward from the film strip, and said index means is formed by a side of said flap immediately adjacent to two film strip sprocket holes.

5. In a film strip packaged in a cassette for use in a camera, the cassette having a light trap, and the film strip having a tongue end projecting from the light trap, sprocket drive holes along a longitudinal edge of the film strip, an emulsion side, and a base side, the improvement comprising:

a compressible projection disposed near the tongue end of the film strip and projecting outward from the base side of the film strip; and indexing means formed by disposing said projection adjacent to at least one sprocket hole of the film strip;

whereby said projection will be at least partially compressed when the film strip is wound on a takeup spool in a camera without interfering with such winding, will reopen outward during rewinding of the film strip into the cassette in such camera, and will contact the cassette light trap as rewindng is continued thereby preventing the tongue end of the film strip from being completely rewound into the cassette, and whereby said indexing means provides a reference for installing the film strip in a camera to allow the film strip to have less than its total number of frames exposed, to be rewound into its cassette, the cassette removed from the camera, and the cassette to be subsequently reinstalled into the camera with the previously-exposed frames in correct registration with the shutter opening and the frame numbers of such frames correctly synchronized with the frame counter of the camera.

6. The improvement defined in claim 5 in which said compressible projection is a flap having a free end and an attached end, said flap formed from the film strip by cutting the film strip so as to orient said free end in a direction toward the cassette light trap and said attached end in a direction toward the film tongue end, said flap being folded outward from the base side of the film strip at an angle slightly less than ninety degrees.

7. The improvement defined in claim 5 further comprising:

a set of numerals from one to a number at least equal to the number of frames of the film strip, said set disposed on an external surface of the cassette, said numerals arranged to be easily removable on an individual basis;

whereby a numeral is removable to indicate a desired frame number.

8. The method of modifying a film strip packaged in a cassette to allow exposure of less than the total number of frames, to then allow rewinding of the film strip into the cassette without winding the end of the film strip completely into the cassette, to allow removal of the cassette from the camera, to allow subsequent reinstallation of the cassette into the camera, and to allow reregistration of the exposed frames with the camera shutter opening and the camera frame counter, consisting of the steps of:

forming a compressible projection on the base side of the film near the end of the film strip with the projection acting as a mechanical stop; and simultaneously locating said projection so as to define an indexing means for accomplishing such reregistration.

9. The method as defined in claim 8 in which the step of forming a projection includes the steps of:

cutting a flap near the end of the film strip with the free end of the flap toward the cassette; and folding the flap outward from the base side of the film; and in which the step of locating the projection includes the step of:

locating an edge of the flap immediately adjacent to at least one film drive sprocket hole, thereby designating such hole as an index mark.

* * * * *